United States Patent [19]
Newton

[11] Patent Number: 5,132,069
[45] Date of Patent: * Jul. 21, 1992

[54] METHOD OF INJECTION MOLDING COMPOSITE ARTICLES

[76] Inventor: John R. Newton, Brackenthwaite house, Black Beck Wood, Storrs Park, Bowness-On-Windermere, Cumbria, LA, United Kingdom, 23 3LS

[*] Notice: The portion of the term of this patent subsequent to Jan. 4, 2009 has been disclaimed.

[21] Appl. No.: 458,620

[22] Filed: Jan. 9, 1990

[51] Int. Cl.⁵ .............. B29C 45/14; B29C 45/16
[52] U.S. Cl. .................. 264/257; 264/261; 264/317; 264/325; 425/543; 425/566
[58] Field of Search .......... 264/257, 328.1, 40.7, 264/258, 136, 137, 317, 261, 328.2, 328.4, 328.7, 328.9, 325; 425/543, 566

[56] References Cited

U.S. PATENT DOCUMENTS

| | | | |
|---|---|---|---|
| 2,913,036 | 11/1959 | Smith | 264/102 |
| 3,632,241 | 1/1972 | Vanderhagen et al. | 425/245 |
| 4,560,523 | 12/1985 | Plumley et al. | 264/257 |
| 4,873,044 | 10/1989 | Epel | 264/257 |
| 4,880,583 | 11/1989 | Douglas | 264/257 |

*Primary Examiner*—Jay H. Woo
*Assistant Examiner*—Jeremiah F. Durkin, II
*Attorney, Agent, or Firm*—Reising, Ethington, Barnard, Perry & Milton

[57] ABSTRACT

A method of molding complex composite articles having skin portions containing fibres to be injected with a resin and a core portion includes providing one or more galleries in the core or fibre skin and injecting resin into the gallery or galleries whereby it is rapidly transmitted to all portions of the skin. The galleries overcome the resistance to flow created by the capillary nature of the fibrous layer and enable more rapid mold cycles to be employed and more complex articles therefore to be molded.

9 Claims, 3 Drawing Sheets

METHOD OF INJECTION MOLDING COMPOSITE ARTICLES

TECHNICAL FIELD

This invention relates to a method of molding and in particular relates to a method of molding complex articles from curable resins.

BACKGROUND OF THE INVENTION

A common method of molding composite articles, known as the resin transfer molding process, involves placing a structure of reinforcing fibers, for example glass, carbon or aramid, into a mold and then injecting a liquid resin into the mold so that it penetrates though the entire reinforcing structure. The resin then cures producing a resin/fiber composite with good mechanical properties and relatively low weight. The final mechanical properties depend on the type of reinforcing fiber and resin employed. A conventional arrangement for transferring resin from a resin injection machine into the fibers in a mold is shown in FIG. 1 of the accompanying drawings. The nozzle from the resin injection machine is clamped to the injection port of the mold and pressurized resin is fed from the injection machine, entering the reinforcing fibers at the injection port. On large moldings more than one port may be used but this presents problems as the resin cures in the feed system and means must be provided for removing the cured resin.

In recent years there has been a significant increase in the possible complexity of moldings made by the resin transfer molding process brought about by the introduction of preforming which allows the assembly of complex configurations of reinforcing fibers together with, for example, the use of foamed plastics material inserts. Cycle times are normally quite long and the degree of complexity limited as the fiber reinforcement restricts the flow and these are primary restriction to an otherwise versatile process.

Composite structures of fibers in a polymer matrix offer low weight, high strength solutions to many engineering problems and their use in application is rapidly growing, and aircraft industries. Composites, typically of glass or carbon fibers in a thermoset or thermoplastic polymer matrix, have tensile strengths comparable with steels, densities in the region of 20% to 25% of steel, and a low modulus. It is the low modulus that is one of the major problems facing designers. Very often large increases are needed to provide equivalent stiffness compared to steel and this demands complex, often three dimensional, structures.

Complex three dimensional structures are therefore what the designer must employ to meet the structural demands of the product. These however, are not technically easy to produce or are prohibitively expensive owing to the long cycle times required.

There is a need therefore for an improvement form of molding process applicable to composite articles which will reduce cycle times, and hence costs, in the production of complex structures. The present invention seeks to provide such an improved method.

The use of a gallery or galleries in a core, which is otherwise resin-impermeable, allows resin to be ducted to wherever needed according to the mold configuration by employing a single resin injection needle. It is preferred that the injection nozzle is inserted into the gallery or one of the galleries in the core. The layer will often be in the form of a 'skin' surrounding the core, and in this case it is preferred that the nozzle is inserted through the skin of the article to be molded into the gallery. On completion of the injection cycle the nozzle is removed prior to the resin curing and the injection port is plugged. The method of the invention allows very complex structures to be produced and cycle times reduced.

The main function of the core normally is to space the skins apart and prevent resin from filling the void between the skins. Any material which withstands the the forces imposed when closing the mold and the injection pressure of resin will in general be adequate. Thus cores are employed in relatively thick moldings and are usually of a closed-cell foamed plastics material, e.g. foamed polyurethane or polyester, for convenience, lightness and cheapness. They may however be of any other desired material such as plaster, wood, wax, and the like. Core materials such as wax offer the possibility of removal after moldings, by melting out. Hollow polymer cores, which could be pressurized, offer the possibility of molding components such as fuel tanks into the composite article. However, where the article is relatively thin and no core would be needed for the above purposes, then the 'core' and the gallery may be one and the same. That is, the 'core' may be present simply to define one or more galleries in the fiber layer.

While the above discussion has referred to a 'resin' it will be appreciated that the process of the invention is equally applicable to other forms of molding composites, for example metal matrix composites whose ceramic fibers are contained within a mold and molten metal is injected into the cavity containing the ceramic fibers. The term 'resin' is to be construed accordingly.

Additionally or alternatively to employing galleries in the core galleries can be provided in the fibers which make up the skin portion. These can be physical galleries, for example tubes inserted into, or holes cut through the fibrous layer, or preferably may be incorporated into the actual weave of the fiber layer. For example a row or rows of weft or warp rovings can be omitted from the weave leaving a gap which will in effect provide a gallery. Alternatively individual or small numbers of warp or weft rovings may be significantly smaller than the principal rovings again leaving a void space which acts as a gallery inducting the resin. However, especially in the latter case, it is preferred to use such galleries in addition to galleries formed in the mold core. It is the properties of the fibers used as reinforcing for composite materials, that is their relative stiffness, which ensures that such voids or galleries retain their integrity under the conditions of molding. The degree of compacting and the fact that the fibers are trapped in the mold accentuate this property.

In order to produce composite products which can be considered as structural members, that is having a high strength to weight ratio and being capable of replacing steel components, the following criteria will normally have to be fulfilled. These are that the reinforcing fibers are elongated and preferably continuous; orientation of the fibers being possible; and fibre density being high, preferably in the region of 60% by weight of the molded portion of the composite, or more.

To achieve the above it is necessary to pack the fibers into the mold very tightly. This considerably restricts the flow of resin and, indeed, at useful levels of reinforcing fiber the voids between them are in fact so small that they may be considered as capillaries. This being the case the voids are subject to the laws of fluid flow that apply to capillaries. In simple terms this means that the surface tension forces become more significant than the pressure used to force the polymer through the fiber layer and hence these control the rate of fluid flow.

It can be shown that when the internal diameter of a tube becomes small the force that can be applied to a fluid within it becomes very small and tends to zero. This is because the force applied is a function of pressure times area and since area reduces with the square of the diameter, as the diameter decreases the area decreases even more rapidly. The viscous resistance to flow through a narrow tube is given as follows.

P applied + P surface tension = P viscous resistance.

If P applied is small, that is where the effective diameter is small, it can be ignored and then $$\theta \div \frac{4\ T\ Cos\theta}{d} = \frac{32\ \mu l v}{d^2}$$

where
v = fluid velocity
T = surface tension
$\theta$ = angle of contact
d = diameter of tube
l = length of tube
$\mu$ = viscosity
Solving for v we get $$V = \frac{Td\ Cos\theta}{8\ \mu l}$$

In any given situation T, d, and $\theta$ are constant and therefore the velocity of flow of resin is inversely proportional to the viscosity and the length of the tube. There are limitations to what can be achieved in lowering the viscosity for a given material. In the case of polymers, heating reduces viscosity but only to a limited extent. Hence if v, the fluid velocity is to be kept as high as possible then l, the tube length, must be kept to a minimum. It is the provision of galleries in the method according to the invention which enables l to be kept to a minimum within the fibre layer.

A further consideration is as follows. When a resin injection nozzle comes into contact with the fibre reinforcement layer, in effect only the area of the capillaries within the fibrous layer that project into the area of the nozzle is available to transfer liquid into the fibres. Because of the nature of fibre laminates, in reality most of the fluid that enters the laminate would do so via the capillaries that are available around the circumference of the nozzle. There is therefore a circular line of penetration through which the liquid enters the fiber laminate and it is the length of this line that becomes more important than the nozzle area. In the method according to the invention employing galleries of the type described more fully hereinafter, the lines of penetration are effectively very long. This again increases the rate of fluid flow into the fiber structure as will be apparent from the above discussion. The 'galleries' employed to duct resin throughout the composite to be molded should have sufficiently large dimensions so as to avoid the restrictions on flow rates associated with capillary flow conditions thus allowing the resin to be ducted throughout the composite in a rapid manner enabling complex three dimensional articles to be produced in very much reduced cycle times. Furthermore, it is not necessary to employ high pressures in the method of the invention. As is apparent from the above discussion even high pressures do not significantly reduce cycle times where capillary flow conditions exist. Moreover high pressures require massive molds and ancillary equipment, and therefore increase molding costs. Typically the process of the invention will employ pressures of no more than 6-bar and often pressures of less than 3-bar.

SUMMARY OF THE INVENTION

In accordance with the present invention there is provided a method of molding complex composite articles, for use as structural members, having a layer containing fibers to be injected with a resin and a core portion which comprises providing one or more galleries in the core or fiber layer and injecting resin directly into the gallery or galleries by inserting a nozzle through a port into the gallery whereby it is rapidly transmitted to all portions of the layer, and thereafter withdrawing the nozzle and plugging the port before the resin cures or is allowed cure.

FIGURES IN THE DRAWINGS

The invention will be described further, by way of example, with reference to the accompanying drawings, in which.

DETAILED DESCRIPTION OF THE PREFERRED EMBODIMENT

Figure 1:
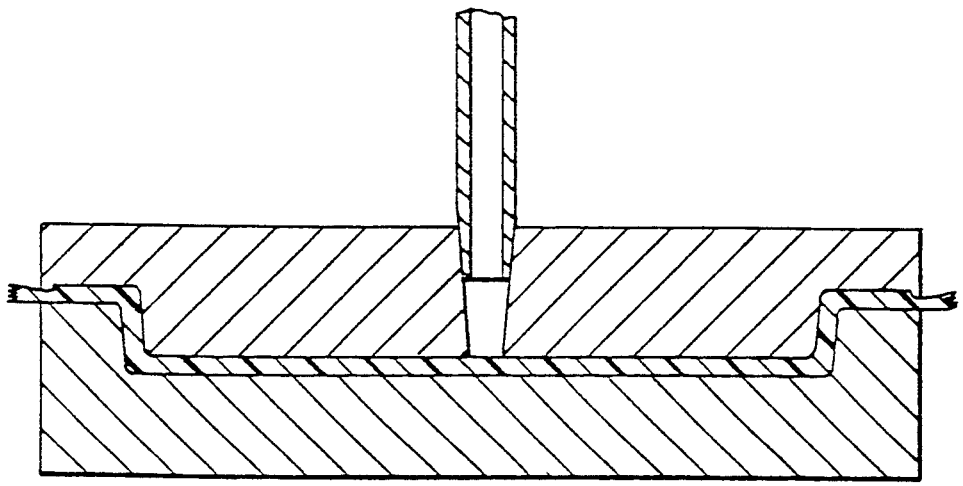
FIG. 1 is a diagrammatic cross sectional view of a mold used for conventional resin transfer molding.
Figure 2:
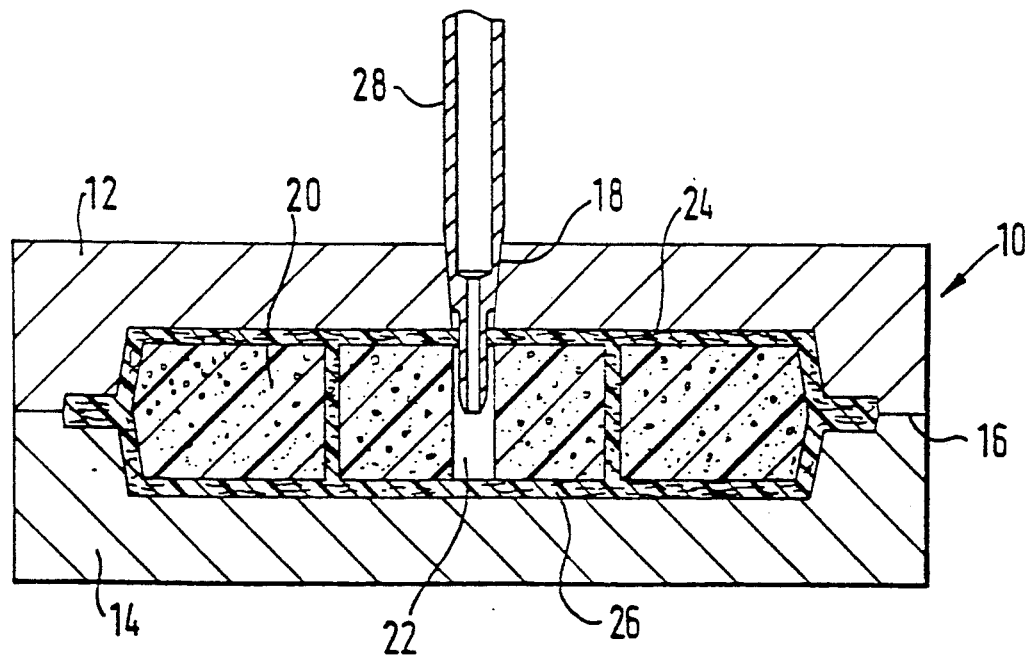
FIG. 2 is a similar view to FIG. 1 of a mold adapted to carry out the method of the invention.
Figure 3:
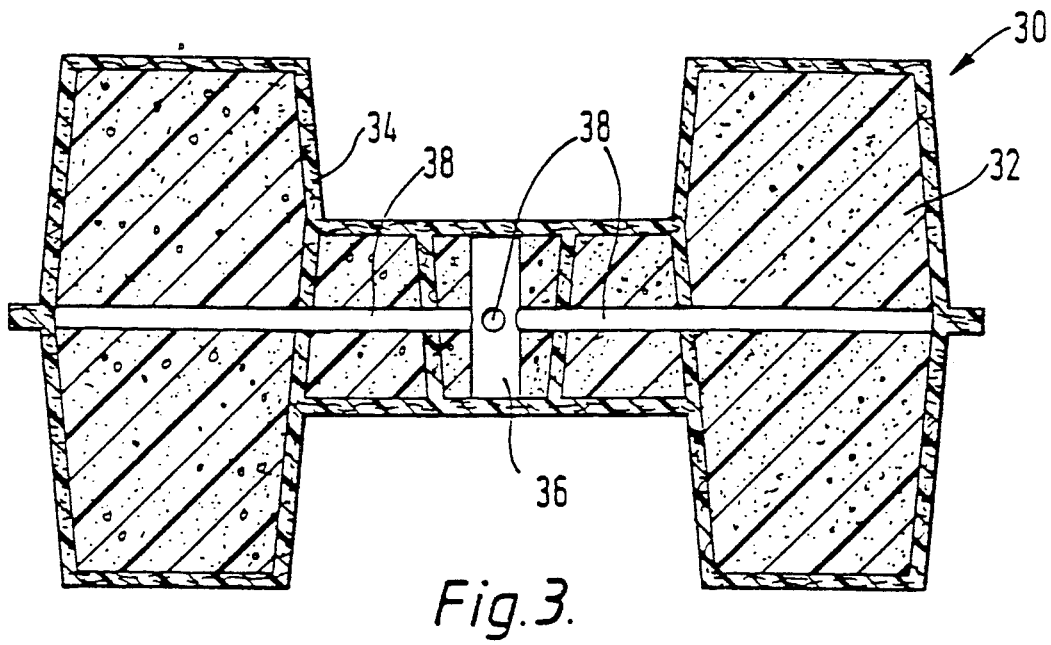
FIG. 3 is a diagrammatic representation of a complex shape capable of being produced in accordance with the method of the invention.

Referring to the drawings, and especially FIGS. 2 and 3, it can be seen that a mold 10 for producing a shape such as that shown in FIG. 2 comprises upper and lower mold halves 12, 14 respectively split at 16 and a single injection port 18. Resin-impenetrable cores 20 of, for example, closed cell foamed plastics material, are placed within the mold cavity surrounded by, for example, layers of reinforcing fibers such as glass, carbon or KEVLAR, which will form 'skins' in the eventual composite in a similar manner to conventional molding processes. However, in accordance with the invention, the core 20 has a void or gallery 22 centrally therein between upper skin 24 and lower skin 26.

An injection nozzle 28 is adapted to pass through the injection port 18 into the gallery 22. Injection of resin into the gallery 22 ensures that it is evenly distributed between the upper 24 and lower 26 skins simultaneously. Side vents (not shown) distributed about the split line 16 ensure that air displaced by the resin can leave the mold cavity.

The apparently simple expedient of providing the gallery 22 within the core 20 ensures that resin is ducted simultaneously to the upper and lower skins 24, 26 and reduces the maximum length that the resin will have to flow through the skins to approximately the mould width or radius. Furthermore, since the gallery width is greater than the nozzle outlet diameter, and since there are now two outlets into the fiber layer instead of one, the line of penetration is considerably increased—by approximately a factor of four—thus allowing resin to be injected into the fibre layer at four times the rate. Thus by the method of the invention and employing the single injection nozzle 28 there is a considerable improvement over having two injection nozzles, one on either side of the mold, that might have been employed in the conventional resin transfer molding methods with the consequent increase in cost and complexity. If it is desired to reduce cycle times even further, additional galleries can be employed, for example of the type illustrated in FIG. 5 and discussed hereinafter. Improvements in resin transfer rate can be orders of magnitude greater than conventional methods can achieve.

Once injection of the resin is complete the injection nozzle 28 is withdrawn and the port 18 is plugged after which the resin is cured or allowed to cure. Demolding in a conventional manner produces an article visually almost indistinguishable from that produced by a conventional and yet the injection time has been considerably reduced over that necessary if no gallery had be provided.

In FIG. 3, a molded product of relatively complex shape is illustrated which would be difficult or impossible to mold satisfactorily employing conventional methods. The product 30 comprises a foam core 32 and outer skin 34. The core 32 has a vertical gallery 36 and four horizontal galleries 38 connecting therewith. The galleries 36, 38 ensure that a resin delivered from a single injection nozzle placed into the gallery 36 will be fed to the remote parts of the mold, allowing a uniform and swift injection of resin. Naturally, resin hardening in the galleries 36, 38 after injection is not a disadvantage—as it would be were the resin to harden in galleries or runs provided externally of the product from which it would need to be cleaned prior to the next molding procedure.

An especial advantage of the process of the invention is that it allows experimentation to find the optimum form of gallery system very cheaply. In a conventional mold, should it be decided that the shape being molded is too complex for a single entry of resin then either additional entry ports must be cut or external runs or galleries cut into the mold body. Needless to say this is time consuming and expensive particularly if several configurations have to be tried before the optimum is found. With the method of the invention galleries need merely be cut in the plastics material foam core which is a very much simpler, quicker and cheaper operation. Thus the optimum configuration can be found rapidly and cheaply. There is available an empirical statistical technique for design optimization which can be applied to the design of the galleries known as the 'Taguchi' method. This method of the invention lends itself admirably to such an approach since changes in configuration can be made rapidly and cheaply. The gallery network could be modelled on computer and the flow characteristics simulated in order to arrive at an optimum design.

Figure 5:
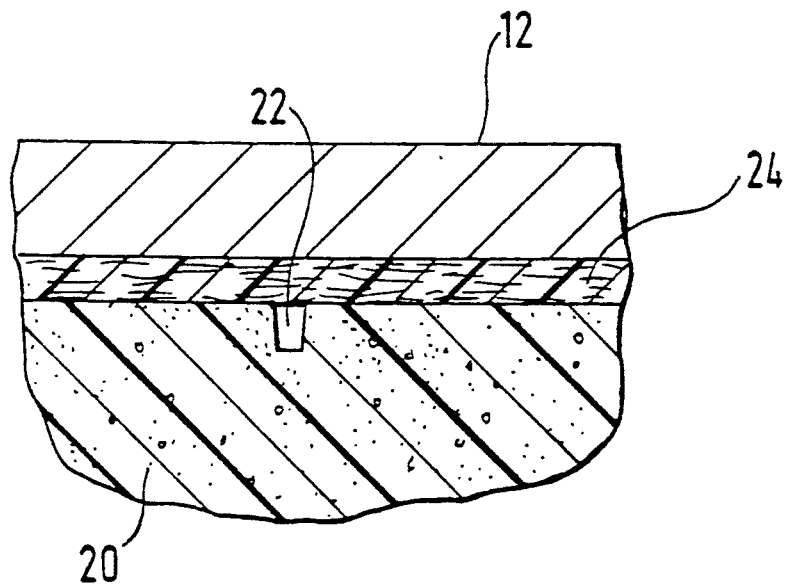
FIG. 5 is a partial view of a mold illustrating a different type of gallery.

While the term 'galleries' has been used herein it will be appreciated that the resin flow passages need not necessarily be totally enclosed within the core. Thus, some or all of the 'galleries' could be at the surface of the mold core and be bounded by the reinforcing fibers constituting the skin. Such a configuration is illustrated in FIG. 5. In such a case it is preferred that the 'galleries' be sufficiently narrow so that the skin portion does not deflect or distort into them. The stiffness of the fibers employed enables them to 'bridge' a narrow gap. The galleries are still formed in the core rather than the mold so that the advantages of the invention are still obtained. Such surface galleries may advantageously be in the form of a fan or web of interconnecting channels, and may be connected to one or more internal galleries. Galleries of the type shown in FIG. 5 allow the resin to be distributed throughout the article whilst simultaneously providing lines of penetration for the resin to enter the fibre structure. Galleries incorporated in the weave of the structure exhibit the same property.

Figure 4:
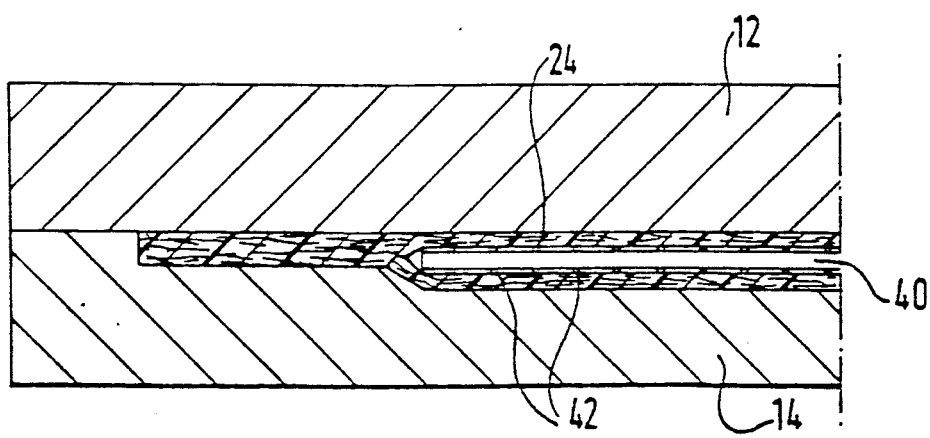
FIG. 4 is a partial view of mold illustrating another embodiment of the invention.

Turning now to FIG. 4, an embodiment is illustrated in which a gallery 40 is effectively formed within the fibrous layer 24. In this case the gallery 40 comprises a tubular core having a series of exit ports 42 to enable the resin to diffuse into the fibrous layer 24 along its length as well as at each end.

Although the method has been described in relation to resin transfer molding, it will be appreciated that it is of broader applicability and may be used with any molding process that employs an internal core to limit and distribute a settable composition to specific areas only. While it is in no way restricted to such an application, the process of the invention is particularly useful in producing the articles described and claimed in European Patent Publication No. 0147050.

EXAMPLE

In order to mold a manhole cover in accordance with the above, a mold of nominal dimensions 600 mm × 600 mm × 76.5 mm was employed. In this were placed 13 cores or closed-cell polyurethane foam surrounded by glass fiber layers to form approximately 62% by weight of the composite portion of the eventual cover.

The central core was provided with a gallery similar to that shown in FIG. 2 hereof, and resin was injected into the gallery so as to run into the top and bottom surfaces of the mold simultaneously. Ten kilograms of isophthalic polyester resin was injected over 7 minutes at a temperature of 40° C. After curing and demolding a strong integral product was produced capable of supporting the weights required in service as a manhole cover. This product could not be succesfully produced in realistic molding times using conventional methods. If the gallery network is extended, by providing four surface galleries in each of the top and bottom faces of the core 20, leading from the central gallery 22, the injection time can be reduced further, to approximately two minutes.

The method of the invention provides a simple, relatively inexpensive and speedy method of producing relatively complex shapes by resin injection.

I claim:

1. A method of molding complex composite articles for use as structural members, said method comprising the steps of:

providing a layer containing fibers to be injected with a resin and a core portion;

providing at least one gallery in at least one of the core and fiber layer;

injecting resin directly into said at least one gallery by inserting a nozzle through a port into said at least one gallery and injecting resin through said nozzle into said at least one gallery whereby the resin is rapidly transmitted to all portions of the layers;

withdrawing the nozzle and plugging the port before the resin cures; and curing said resin.

2. A method as defined in claim 1 further comprising:

said core being a resin impermeable foamed plastics material.

3. A method as defined in claim 2 further comprising:

said at least one gallery being provided in said core.

4. A method as defined in claim 1 further comprising:

said at least one gallery being provided in the fiber layer.

5. A method as defined in claim 1 further comprising:

said at least one gallery being at the surface of the core and being bounded by the fiber layer constituting a skin.

6. A method as defined in claim 1 further comprising:

the fibers in the layer being selected from the group consisting of glass, carbon, and aramid.

7. A method as defined in claim 1 further comprising:

said core being selected from the group consisting a closed cell foamed polyester and polyurethane material.

8. A method as defined in claim 1 further comprising:

said fibers being elongated and continuous.

9. A method as defined in claim 1 further comprising:

said gallery providing at least one line of penetration into the layer.

* * * * *